US010878475B2

(12) United States Patent
Fish

(10) Patent No.: US 10,878,475 B2
(45) Date of Patent: Dec. 29, 2020

(54) SYSTEMS AND METHODS FOR STORING AND RETRIEVING GOODS AND SERVICES INFORMATION USING PARAMETER/VALUE DATABASES

(71) Applicant: Robert D. Fish, Irvine, CA (US)

(72) Inventor: Robert D. Fish, Tustin, CA (US)

(*) Notice: Subject to any disclaimer, the term of this patent is extended or adjusted under 35 U.S.C. 154(b) by 199 days.

(21) Appl. No.: 16/009,065

(22) Filed: Jun. 14, 2018

(65) Prior Publication Data

US 2018/0293634 A1 Oct. 11, 2018

Related U.S. Application Data

(63) Continuation of application No. 11/550,490, filed on Oct. 18, 2006, now Pat. No. 10,026,112.

(60) Provisional application No. 60/728,370, filed on Oct. 18, 2005.

(51) Int. Cl.
G06Q 30/00 (2012.01)
G06Q 30/06 (2012.01)
G06Q 30/02 (2012.01)

(52) U.S. Cl.
CPC ......... G06Q 30/0623 (2013.01); G06Q 30/02 (2013.01); G06Q 30/0631 (2013.01); G06Q 30/0641 (2013.01)

(58) Field of Classification Search
CPC ............... G06Q 30/0623; G06Q 30/02; G06Q 30/0631; G06Q 30/0641
See application file for complete search history.

(56) References Cited

U.S. PATENT DOCUMENTS

| 6,195,652 | B1* | 2/2001 | Fish | G06F 16/9537 |
| 6,708,174 | B1* | 3/2004 | Tenorio | G06F 16/24578 |
| 6,772,150 | B1* | 8/2004 | Whitman | G06F 16/24534 707/721 |
| 6,978,277 | B2* | 12/2005 | Reed | G11B 27/105 |
| 7,873,622 | B1* | 1/2011 | Karls | H01L 27/222 707/707 |
| 8,321,427 | B2* | 11/2012 | Stampleman | G10L 15/02 707/749 |

(Continued)

OTHER PUBLICATIONS

"Form and Function: The Impact of Query Term and Operator Usage on Web Search Results," by Wendy Lucas and Heikki Topi, Journal of the American Society for Information Science and Technology, 53(2): 95-108, Jan. 15, 2002 (Year: 2002).*

(Continued)

Primary Examiner — Anne M Georgalas
(74) Attorney, Agent, or Firm — Fish IP Law, LLP

(57) ABSTRACT

Improvements for parametized storage and retrieval of multiple different types of marketplace items include: (a) providing lists recommended parameters to guide users' entry and searching of data; (b) limiting users to suggesting additions of new parameters to the system; (c) an item classification based in whole or in part upon a trademark classification; (d) a data structure in which value data is stored in cells of a table for which a given column can represent multiple different parameters; (e) values can comprise links that resolve to particular items of data other than a file, a web site, and an email address; data is loaded en masse, and then distributed to edge cache databases; and (f) users can privatize individual records and values within their loaded data.

19 Claims, 15 Drawing Sheets

(56) References Cited

U.S. PATENT DOCUMENTS

| | | | |
|---|---|---|---|
| 8,341,143 B1* | 12/2012 | Karls | G06F 16/9038 707/708 |
| 2003/0023505 A1* | 1/2003 | Eglen | G06Q 30/0207 705/26.41 |
| 2004/0205451 A1* | 10/2004 | Kowalski | G06F 40/279 715/255 |
| 2005/0166046 A1* | 7/2005 | Bellovin | H04L 63/0428 713/165 |
| 2006/0026113 A1* | 2/2006 | Omoigui | G06Q 10/00 706/55 |
| 2018/0025010 A1* | 1/2018 | Ramer | G06F 16/7867 707/727 |

OTHER PUBLICATIONS

"How a search engine works," by Elizabeth Liddy, Searcher 9.5: 38-45. Information Today, Inc., May 2001 (Year: 2001).*

* cited by examiner

SUPERSEARCH™ — 10

Main Menu

Automobile with Color=red or white, Make=Lexis, Model=L430,
Price ≤ 60,000 and ≥ 40,000 and, Year >2002

| Record number | email address | Mileage (miles) | Auction - last bid | Auction - last bid date/time | Phone number | Photo 1 | Photo 2 | Condition | Year |
|---|---|---|---|---|---|---|---|---|---|
| 1 | RThompson9999@hotmail.com | 24,000 | 22,000 | 6/12/05 22:15 | private | =>1112 | =>68111 | Excellent | 2004 |
| 2 | Jsmith2153@lvcos.com | 39,858 | 19,500 | 6/12/05 22:19 | 714-555-1212 | =>4478 | =>77789 | Very Good | 2003 |
| 3 | | | | | | | | | |
| 4 | | | | | | | | | |
| 5 | | | | | | | | | |
| 6 | | | | | | | | | |
| 7 | | | | | | | | | |
| 8 | | | | | | | | | |
| 9 | | | | | | | | | |
| 10 | | | | | | | | | |

143 — Sort       Previous #1 Next Last    Show All

Figure 4B

SUPERSEARCH™ — 10

20 { Search   Web Search   Search History   Add New Items

Personal Information (* required for bidding on auctions) — 331B

| * | Last name |  |  |
|---|---|---|---|
| * | First name |  |  |
| * | Address |  |  |
| * | Address |  |  |
| * | City |  |  |
| * | State |  | ▶ |
| * | Country |  | ▶ |
| * | Postal code |  |  |

331A

| * | Email address |  |  |
| * | Password |  |  |
|   |   |   |   |
| * | Credit Card Type |  | ▶ |
|   | Number |  |  |
|   | Expiration month |  | ▶ |
|   | Expiration year |  | ▶ |
|   | CIS code |  |  |

Maximum number of records output
 20   100   150   200
Web Search Number of Records
 50   250
Standard Units
Override Units    British    European (MKS)
 (see table to right)
Languages        French    German    Japanese
Adult filter search
 Off

360 —

| Area (medium) | square feet |
| Area (large) | square feet |
| Bits & Bytes | megabytes |
| Density | ounces/cubic inch |
| Energy | KCal |
| Force | pounds force |
| Length | feet |
| Mass | pounds weight |
| Power | horsepower |
| Pressure | pounds per sq inch |
| Speed | miles per hour |
| Temperature | degrees Fahrenheit |
| Volume |  |

Clear

Figure 6

| RecNo (4) | UserID (4) | DateAdd (3) | DateDelete (3) | Private (1) | Class (2) | P1 (3) | V1 (4) | P2 (3) | V2 (4) | ... | P14 (3) | V15 (4) |
|---|---|---|---|---|---|---|---|---|---|---|---|---|

Repository Items

| RecNo (3) | Class (2) | Name (20) | Private (1) | Units (2) | Set (1) | Recommend (1) | Data Type (1) | Format Pointer (2) |
|---|---|---|---|---|---|---|---|---|

Parameters

| RecNo (4) | Name (16) | Private (1) | Ltd values pointer (2) |
|---|---|---|---|

Values

SYSTEMS AND METHODS FOR STORING AND RETRIEVING GOODS AND SERVICES INFORMATION USING PARAMETER/VALUE DATABASES

This application claims priority to co-pending U.S. non-provisional application Ser. No. 11/550,490, filed Oct. 18, 2006, which claims priority to U.S. provisional application No. 60/728,370, filed Oct. 18, 2005. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is databases for storing and retrieving marketplace information.

BACKGROUND OF THE INVENTION

It is now widely recognized that the main challenge to information storage and retrieval is not availability of information, but filtering that information. Modern search engines that rely on keyword searching have advanced that science to a high art, but searches performed with such search engines often yield an intractably large number of records. For example, a recent search for diamonds on e-Bay™ yielded more than 6000 records, and the same search on Yahoo!™ Shopping yielded more than 570,000. The problem is even worse on general search engines that are not specifically focused on marketplace items. A recent search on Google™ for diamonds yielded about 24,300,000 records.

Not only are there too many records in a typical results set, but the fact that the records are so inconsistent in content and terminology means that it is impossible to filter them correctly. To continue with the diamond example, it is extremely difficult to search for a diamond in the 1,000 to $2,000 price range, because there is no convenient way to match a record that lists a diamond for $1,499.85. The current answer to that problem is to tag the data with metatags, special codes that identify particular items of data. Using Microsoft's™ XML tags, for example, it is possible for a search engine to identify a number as a price, and then store the price in an indexed field. In that manner the search engine could find records with information that matches a range of prices.

Tagging works reasonably well for the parameter (i.e. characteristic) of price, but only because price is common among a great many marketplace items. The system loses much of its effectiveness as soon as one begins to focus on parameters that are specific to different types of goods and services. In the diamond example, a searcher might well be interested in only those diamonds having a size of at least 1 carat, clarity of at least VVS2, color of at least E, and so forth. The only way metatags could be used effectively to filter through only the desired diamonds would be for the data to have been stored using consistent metatags, and that just isn't done. Thus, despite the prevalence and enormous power of modern search engines, they are still of very limited usefulness in conducting searches such as the diamond example above. To search for that limited selection of diamonds on eBay™ one would have to actually view each and every one of the more than 6,000 records.

As a result of the inability of search engines to adequately narrow searches based upon multiple different parameters, there are still many millions of databases used for specific classes of products. For example, there are automobile databases that store item information using fields for one or more of make, model, year, mileage, and price. Similarly, there are boat databases that store boat information in fields for make, model, year, condition, and price, and also length, displacement, number of sails, number and size of engines, number of cabins, and so forth.

Unfortunately, there are still very significant problems with those specialty databases. For one thing, the sheer number of specialty databases means that the data is distributed, forcing a searcher to examine the data from many different databases for even a single type of product. Thus, a searcher conducting a thorough search for a used car is forced to examine hundreds or even thousands of automobile databases. There are consolidator services that collect data from many different databases, but disparity in the underlying data forces them to present the data in formats that cannot be properly filtered, and are still incredibly time consuming to utilize.

A second problem with specialty databases is that they exist only for a relatively small number of products and services. One would be hard-pressed to find anything even close to a comprehensive flashlight database, or a comprehensive ball-bearing database. The closest that one finds in such fields are vendor listings that show only the particular products they have to sell.

A third problem with specialty databases is that they tend to parametize the data using only a very limited number of parameters. For example, the automobile databases typically do not parametize color or condition. A searcher wanting to view only red automobiles in at least very good condition needs to view the memo text, and sometimes the images, of every single record to find desired automobiles.

What is needed is a universal database that parametizes data for all different types of goods and services. But the very fact that different types of items require different sets of parameters makes it extremely difficult to store multiple different types of items in a single database. Instead of a table with 5 or 6 columns that might be needed for a single type of item, a simple flat table adequately storing different types of items might well need thousands of columns. Still further, the cells of such a table would be mostly empty, since only a few of the cells in each row would be populated.

These problems were addressed in U.S. Pat. No. 6,035,294, 6,195,652, and 6,243,699, the disclosures of which are incorporated herein by reference. In those three patents the focus was on a database that evolved by virtue of: (a) users being able to add their own parameters for a given type of item; and (b) the list of available parameters being shown to subsequent users in a list that was sorted by frequency of use. Frequently used parameters would eventually float to the top of the list, while infrequently used parameters would sink to the bottom of the list. It was still further contemplated that users could add their own values to a values listing, which would similarly be sorted by frequency of use, so that commonly used values would appear at the top of the list while infrequently used values would sink to the bottom.

By way of example, a user would list an automobile for sale by selecting 10 or 15 parameters from a list of possibly 30 or more automobile related parameters. Since the list of available parameters would be sorted by prior usage frequency, the 10 or 15 parameters that the user would most want to utilize would be those at the top of the list. Most likely, the user would thereby decide to describe his automobile using make, model, year, color, mileage, etc. He could select a parameter called exhaust system, or add such a parameter if it wasn't already in the list, but he would be dissuaded from doing so by a desire to conform to the prior usage patterns of others. With respect to values, the user would likely see that prior values for color are white, black, red, green, blue, etc. He might also see that off-white is a color that had been used by others, but he would likely be dissuaded from using off-white because that color is much farther down the list than white.

Since there are many thousands of different types of products and services for which one could store records on the database, it was contemplated that the classification scheme should be hierarchical. The patents cited above contemplated a three level classification tree, including major class, minor class, and item description.

In terms of database structure, the U.S. Pat. No. 6,243,699 patent cited above contemplated separate tables for users, classification, parameters, values, and items, with the items table having columns for classification pointers, parameter pointers, and value pointers. Assuming that each item could be adequately described with a relatively small maximum number of parameter/value pairs, the items table only needs about 2n+c columns, where x is the maximum number of parameter/value pairs, and c is a small number (perhaps 5) to identify classification, date, user pointer, and so forth. Assuming that each row consumed only about 256 bytes, one could store 100 million items in only 25 gigabytes.

It is now contemplated that many of the ideas disclosed in those prior patents could be improved upon. For example, allowing users to add their own parameters to the database may be problematic because users could add all manner of stupid and inconsistent parameters. It is also contemplated that sorting parameters and values by frequency of prior occurrence could in many instances be cumbersome. In selecting a value for color, for example, a user might simply prefer to see an alphabetic list of colors that had been used by others. It is also contemplated that even a three level classification scheme is too complicated for many users, and that the data structure previously described, although very efficient for storing data, would be far too slow for retrieving data. Thus, there is a need for further improvements.

SUMMARY OF THE INVENTION

The present invention contemplates systems, databases, methods and implementations for parametized storage and retrieval of multiple different types of specific marketplace items.

In one aspect it is contemplated that instead of listing available parameters for a given classification of item by frequency of prior usage, the system can advantageously provide users with a broader list of available parameters, and narrower list of recommended parameters. One or both of the lists are preferably sorted alphabetically, are scrollable, and users can select which list to view using a radio button. Narrower lists are preferably limited to no more than 30, 25, 20, or 15 parameters. It is also contemplated that values listings for a given parameter and item classification can advantageously be displayed to a user with broader list and narrower (recommended) listings.

In another aspect, it is contemplated that users would be limited to suggesting additions of new parameters to the system, rather than having the ability to automatically add new parameters on their own, without oversight. This new paradigm may well be superior to that taught in the U.S. Pat. Nos. 6,035,294, 6,195,652, and 6,243,699 patents because it is entirely possible that the general public cannot be trusted to add parameters on their own. Among other things, it is contemplated that a user could suggest the new parameter for use with one or more specific item classifications, and if accepted, the new parameter could be designated as part of a recommended subset of available parameters. It is also contemplated that users could suggest additions of new values to the system, for use with particular parameters, and that such new values could thereafter be included in preferred or other values listings.

In yet another aspect, a database implementing the system preferably includes a table having a plurality of parameter records, each of which includes a designation as to whether that parameter is recommended. The parameter records also preferably include designations for item classification, so that a common parameter such as price might be stored using thousands of records, corresponding to the thousands of different item classifications for which price is a useful parameter. In addition, parameter records preferably include designations for information type (e.g. text, image, video, audio), units (e.g., meters, kilograms, seconds, miles), data type (e.g. integer, floating point, telephone number, text (literal), and link), confidentiality designation (i.e. private or public), and limited choice designation (e.g., yes or no; red, white or black; in stock or out of stock).

In yet another aspect, systems can utilize an item classification based in whole or in part upon a trademark classification. This aspect allows a system to get up and running for substantially all classes of goods and services without having to design an entirely new classification, while also benefiting from a system that is designed to distinguish goods and services by how they are perceived in the marketplace. Preferred item classifications are relatively flat and simple, and in the case of the US and international classification systems used by the US Trademark Office (within the United States Patent and Trademark Office), the system is only two level. Especially preferred item classifications have at least a 25%, 50%, 75%, 80% and 90% homology with a US classification used by the USPTO.

In yet another aspect, systems can utilize a data structure in which value data is stored in cells of a table for which a given column can represent multiple different parameters. Thus, for example, $cell_{E,10}$ (i.e., column E, row 10) might well store a price, while $cell_{E,11}$ might well store a color. Such as data structure could readily store parametized data for a hundred millions items that collectively use tens of thousands of different parameters, in less than 30 GB, yet provide incredibly efficient searching. It is also contemplated that one can store data in a localized or distributed repository, and then send copies of subsets of the data (preferably data for specific item classifications) to edge caches for searching. It is still further contemplated that the repository data could be stored using one data structure, and data in the edge caches could be stored using a different data structure.

In yet another aspect, systems are contemplated in which at least one of the stored values comprises a link that resolves as a particular item of data other than a file, a web site, and an email address. The data can resolve to any desired data, including text of no more than 10, 15, 20, 30, 40, or 50 characters, a currency amount, a number having no more than 5, 10 or 15 significant digits. All suitable links are contemplated, including an IP address, an IP address and an offset, a data tag name, and an HTML code. The resolved data can advantageously be encrypted or privatized in some other manner, so that it will effectively be available to some users and not to others. This aspect of contemplated systems allows overlap and smooth interaction with proprietary databases, such as the reservations and sales databases of airlines, ticket agencies, lodging providers, as well as databases of auction facilitators, dating services, and employment and a job listing sites In yet another aspect, systems are contemplated in which data is loaded using the steps of associating individual identifiers with individual ones of the parameters; publishing a list of the identifiers and associated parameters; examining a set of items for which values are organized using at least some of the published identifiers; extracting item data from the set of items, and storing the extracted item data in the database; associating the item data with a provider, storing contact information for the provider in a provider record, and associating the stored item data with the provider record in the database; and distributing the stored item data to at least two edge cache databases that are accessible by ordinary consumers for retrieval of the items. The items to be loaded are preferably stored in Excel™ or other spreadsheet (s), can be transmitted as a file for loading, or can be accessed using a link on a packet switched public access network. The identifiers can advantageously include metadata tags.

In yet another aspect, systems can advantageously comprise a facility with which data providers can privatize individual values within their loaded data. One preferred such facility comprises a database that designates a specific parameter as being private, and a data display interface that enforces the privacy of a corresponding private value. Another such facility comprises an interface through which the data providers can designate a value as being private even though a parameter to which the designated value is associated is not designated as being private. Still another such facility comprises the data providers storing as private values pointers to encrypted data elements. Regardless of the specific facility utilized, the data display can advantageously depicts the private value using a marker other than the private value, a null, or at least one blank. Markers can have the same or (preferably) different lengths from the value, and markers can be automatically replaced with the private value for appropriate users, or replaced on an ad-hoc basis with a pass code or other device.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

FIGS. 4A and 4B are mock-ups of sample search results display interfaces.

FIG. 6 is a mock-up of a sample preferences interface.

DETAILED DESCRIPTION

A. Interfaces

Figure 1A:
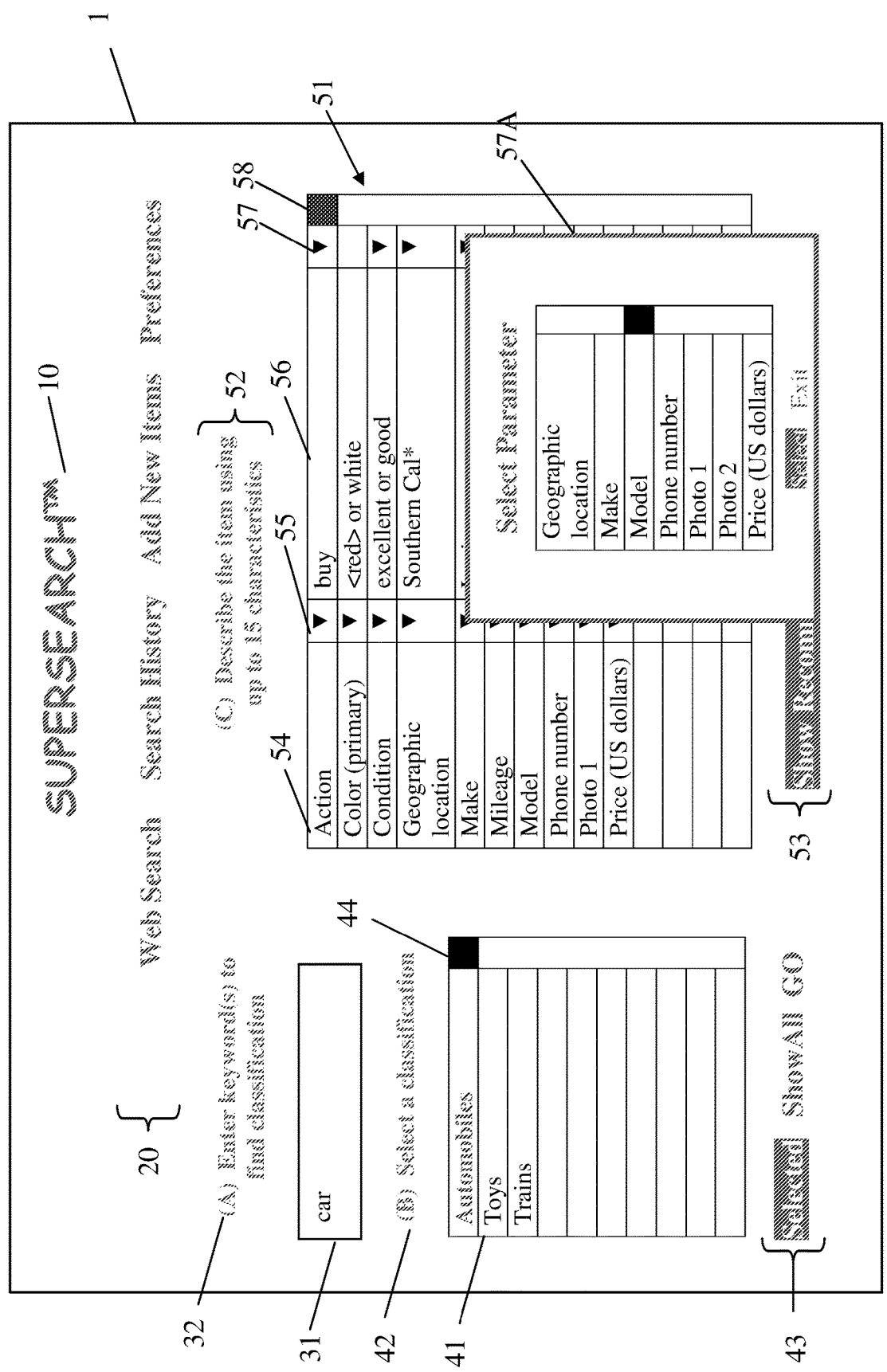
FIG. 1A is a mock-up of a sample search interface, showing a drop-down box to select parameters.
Figure 1B:
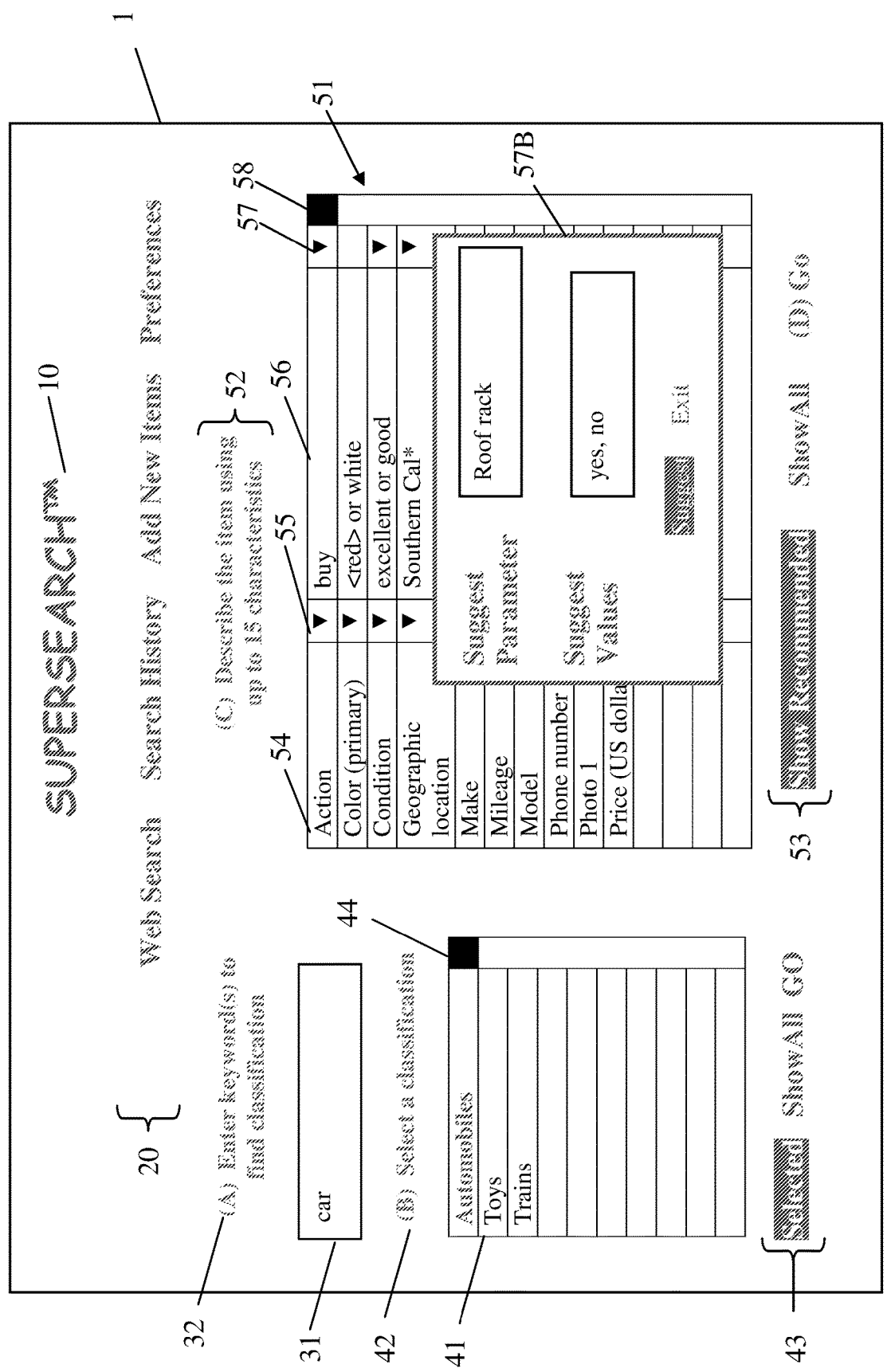
FIG. 1B is s the mock-up of FIG. 1A, showing a drop-down box to suggest addition of a new parameter.

In FIGS. 1A and 1B, a sample search interface 1 generally comprises a company identifier 10, a navigation line 20, box 31 and instructions 32 for entering keywords to identify an appropriate item classification, a classification results interface 41 and instructions 42, and an item description interface 51 with instructions 52.

As used herein, the terms "user", "data provider", "data searcher" and the like refer to natural persons within the general public, acting in their capacities as ordinary users of the system, and not to persons acting in their capacities as programmers, systems analysts or the like who modify the structure (as opposed to the content) of a database. The terms do not include computer programs, bots, and the like.

Most of the items on the list will be self-explanatory. The general concept is that a user navigates if necessary by clicking on the search box in the navigation line 20. In step (A) the user then enters one or more keywords in box 31. In this particular example a user entered the term "car". Depressing a tab, enter or other appropriate key on the user's keyboard causes the system to list possible item classifications. As used herein the term "causes" is used in a broad sense to include direct and indirect causation. Thus, a clicking action of the user only causes the system to respond in a given manner in the sense that there is software being executed by a computer that runs though sets of commands to achieve the result. Indeed, it should be appreciated that all of the computer steps discussed in this applicant are contemplated to be executed on one or more computer, and that all such software must at some time be resident on one or more computer readable media.

Having considered numerous different possible classification systems, and having even designing an extensive three level system, it is now contemplated that the best route is to utilize a classification that is the same as, or at least derived from, a trademark classification system. Such systems are already designed and battle-tested, and distinguish products and services the way they tend to be distinguished in the eyes of ordinary consumers. The two most preferred such classification systems are the US and International classification systems used by the US Trademark office. An example is shown in FIG. 1A. Here the user typed car, which on the USPTO webpage for Acceptable Identification of Goods and Services at http://tess2.uspto.gov/netahtml/tidm.html returns 95 listings, from "dope for model airplanes" in class 002 to ordinary "cars" in class 12, to "entertainment services" for participation in sporting events in 39.

In step (B) the user can then double click on one of the selections to populate the parameters table 51. Since many users might balk at the term parameters, the interface uses the friendlier term, characteristics; the two being considered interchangeable in this application. Alternatively, the user can click on the Show All button on the classification selection line 43, which presents the user with an alphabetical listing of all classifications. Item 44 is a slider, which is of course only useful where there are more classifications in the list than can be displayed in the space available. By way of clarification, it will be appreciated that the system shows only a recommended proper subset of the full set of parameters currently used by others to store parameter-value pairs for similar marketplace items in the classification, and that the subset (and indeed the full sets) are different for different classifications. In the particular examples of FIGS. 1A and 1B, the subset of parameters selected to be shown are deemed to be "recommended" because those are the ones that the system chose to show. It should also be appreciated that the items that are not shown are actually missing from the interface. They are not merely hidden by virtue of being lower down on a drop-down box.

Figure 1C:
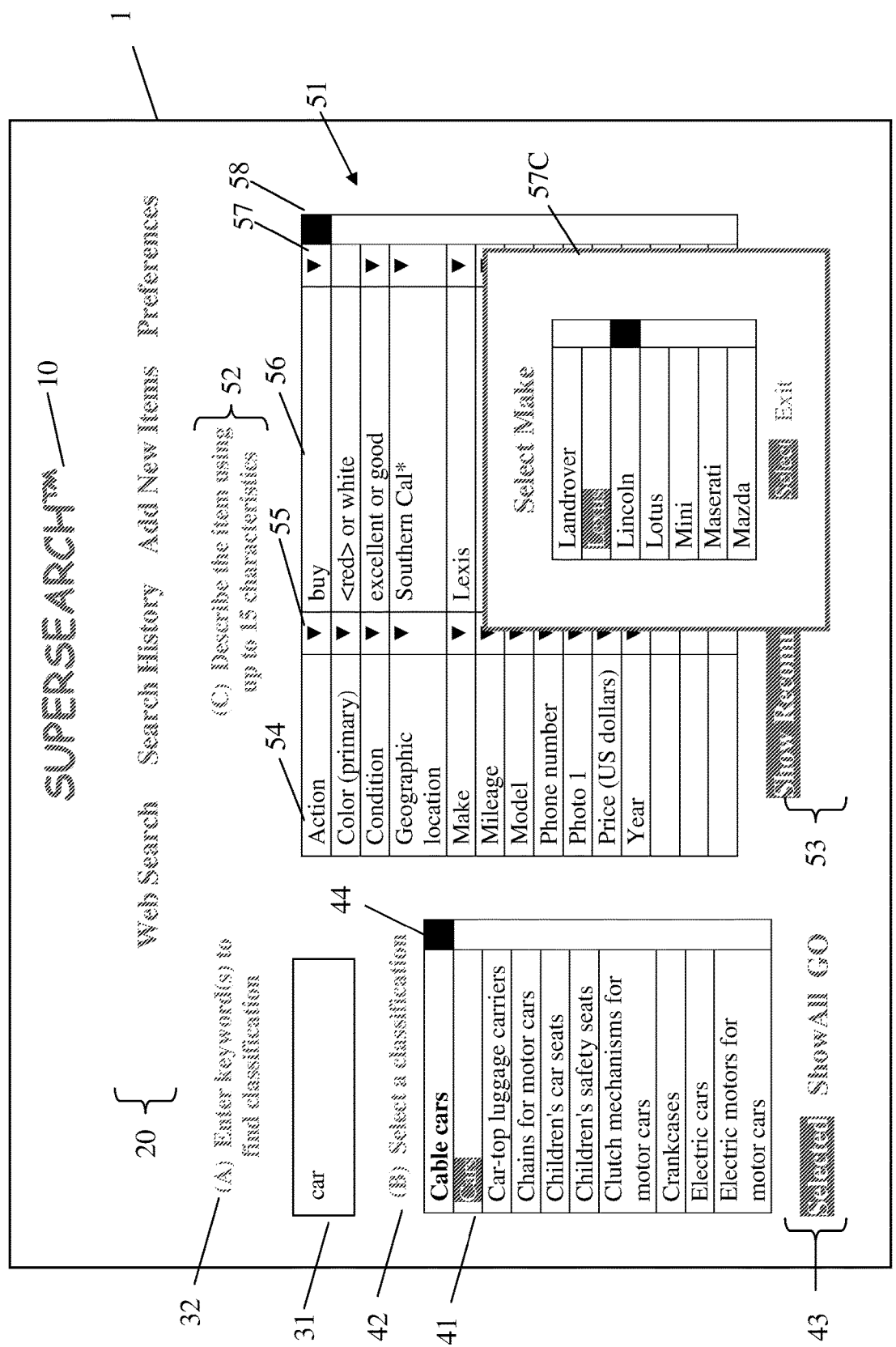
FIG. 1C is the mock-up of FIG. 1A, additionally showing a drop-down box to select values.

In step (C) the user changes one or more of the parameters 54 using the drop-down trigger 55 designated with the "▼" character, and then enters a filter value 56 if desired for one or more of the parameters, either by typing in data or by using the drop-down trigger 57, again designated with the "▼" character. FIG. 1A additionally shows a sample pop-up box 57A for selecting a parameter, in this case from the recommended parameters listing. FIG. 1B additionally shows a sample pop-up box 57B for suggesting a new parameter, in this case "Roof rack". The parameter can be used to store information for the current item, but will only be added to the list of recommended parameters at the discretion of whoever controls the system. FIG. 1C additionally shows a sample drop-down box 57C for selecting a value, in this case automobile makes from the recommended values listing. Slider 58 allows the user to view additional rows (if any) of parameters/value pairs. Typically the user will be limited to selecting only a maximum number of parameters, such as 10, 15, 18, 20. The maximum number may remain constant, or perhaps more advantageously, may be changed by the system depending the item classification, since filtering for some types of items could require more parameters than others.

The item description selection line allows a user to choose between listing only narrower recommended groups of parameters and values in the drop-down boxes, and listing broader groups of parameters and values. The system obviously could utilize separate selection buttons for parameters and values, but in this particular instance a single set of buttons controls both. Although optional, providing users with recommended lists is considered to be an important feature, and a significant advantage over the prior art. Among other things it still encourages users to add and search for commonly parameters and values, and thereby encourages but does not require strict conformance to a severely limited set. The lists can be sorted in any suitable manner, but more helpfully will likely be sorted alphabetically.

Although most of the appropriate parameters would presumably be available to the user in either the narrower or broader listing of parameters for this particular item classification, it is contemplated that users could suggest adding a parameter or even a value. Any suitable trigger could be used to pop up or otherwise access a suggestion window, but to keep matters simple it is preferred systems automatically pop up a suggestion window (see e.g. box 57B) whenever a user enters text (not pure numbers) that doesn't match a previously known parameter or value.

It is contemplated that a user can only have one value for a given parameter, unless they are listed in the alternative. Thus, a user could select cars that are red or white, but not cars that are red and white, at least not while using a single parameter called color. To accommodate cars with two colors, the system can use parameters such as Color (primary) and Color (secondary). This manner of handling multiple values for a single type of parameter It is still further contemplated that parameters can be related, so that choosing one parameter causes the system to automatically utilize the coupled parameter(s). Coupled parameters are most advantageously those parameters that relate to hierarchical information in the real world. Thus, if a user were to use the term "volume" as parameter with respect to automobiles, it would be wise to couple that parameter with another parameter such as "engine cylinders" or "interior". Otherwise it is unclear whether the user is referring to engine displacement, interior space, trunk size, or size of gas tank.

Photos, video, and audio files can be searchable. Suitable filtering values will tend to vary from classification to classification, but as a general guide it can be said that such files can be searchable by matching with a link, another file, or description. For example, an audiovisual file could be searched for a particular sound clip, or it could be searched for text in a file name. Most of the time, however, it is contemplated that a user will include parameters relating to such files so that the links to the files will appear in the results matrix.

The careful reader will appreciate still further that some values can be left blank. Indeed, it may be that a searcher will leave most of the values blank because she doesn't want to filter on the corresponding parameters. Even so, selection of desired parameters is important, since at least in preferred embodiments the results matrix will include a column for each of the listed parameters (except perhaps, to save space, those parameters for which the user selected a single value). Thus, the column headings in FIG. 4A match with the parameters chosen in FIG. 1A, less those parameters for which the user selected a single value.

Of course, what constitutes the rows and columns of any table is merely a matter of perspective, and those skilled in the art will appreciate that the terms "row" and "column" are merely designators for axes in a matrix. Thus, with respect to the specification and the claims, any given description referring to rows and columns is to be interpreted both in the orientation described, and in an equivalent rotated or otherwise transposed orientation that provides substantially the same information.

Although it is not obvious from the figure, the values listed by drop-down box 59 are preferably linked to the parameter on the same line, and the selected item classification. Thus, both a narrower listing of recommended values and a broader listing of values would very likely vary significantly between an item classification of automobiles and an item classification of desktop printers. Both may include parameters of make, model, price, and condition, but automobiles would likely also include parameters for color, year, mileage and the like, while the printers might list speed, tray capacity, dots per inch, ink cartridge type, and so forth.

The recommended parameters and recommended values may be, but are not necessarily, related to frequency of prior usage. Indeed, there are advantages to recommending parameters and values that are not entirely based upon frequency of prior use, including especially the fact that the first users within a given item classification might otherwise get that classification off to a bad start by utilizing parameters and/or values that other users would find inappropriate, offensive, and so forth. It should also be appreciated that the term "recommended" parameters and values means that there is at least one parameter, or value as the case may be, that is not recommended. Thus, if a system stores values for a total of ten parameters in a given classification, and the user is shown all ten parameters without any distinguishing feature as to why one is recommended over another, then those parameters are not deemed to be recommended. The term "recommended" is also different from "required". Thus, if a system stores ten parameters for a class of items, and requires data on three of those classes, then those three parameters are not considered to be "recommended" as the term is used herein. There may be another five parameters that are recommended, and in that case there would be three required parameters, five recommended parameters, and only two parameters that are not recommended.

Some of the values, such as "buy" in the first row, and Lexis in row seven, and L430 in row nine, are very likely available in the drop-down listings. Others, such as the price in the penultimate row, are likely to be typed directly by a user. It is contemplated that the system can try to complete the entry (autofill) as soon as the user begins typing. It is also contemplated that the system can check for spelling, and if a word appears to be mis-spelled, the system can inquire as to whether the user meant one or more standard spellings of words. Row three illustrates that a user could designate that a particular value can be searched using synonyms. In this instance <red> signifies that the system should also search for values such as maroon and rose. Row three also illustrates that preferred embodiments allow users to employ Boolean logic. Row six illustrates that preferred embodiments allow a user to employ wildcards. The price and year values in the final two rows demonstrate that preferred embodiments allow users to utilize open and/or closed ranges.

Units can be handled in any suitable manner. In preferred embodiments, each parameter to which units could reasonably apply is associates with a particular unit of measurement. However, the units used by the a given user would be determined by a table in his Preferences, and the system would perform all conversions automatically. In this particular instance the user is assumed use US dollars as his default currency, so the system shows price in US dollars. If the user had chosen to use Euros, the parameter would preferably have shown "Price (Euros). Results from units conversion would preferably be rounded as shown to the user.

Finally, in step (D) the user clicks (or double clicks depending on preferences of the interface designer) on the GO button to cause the system to begin the search.

Figure 1D:
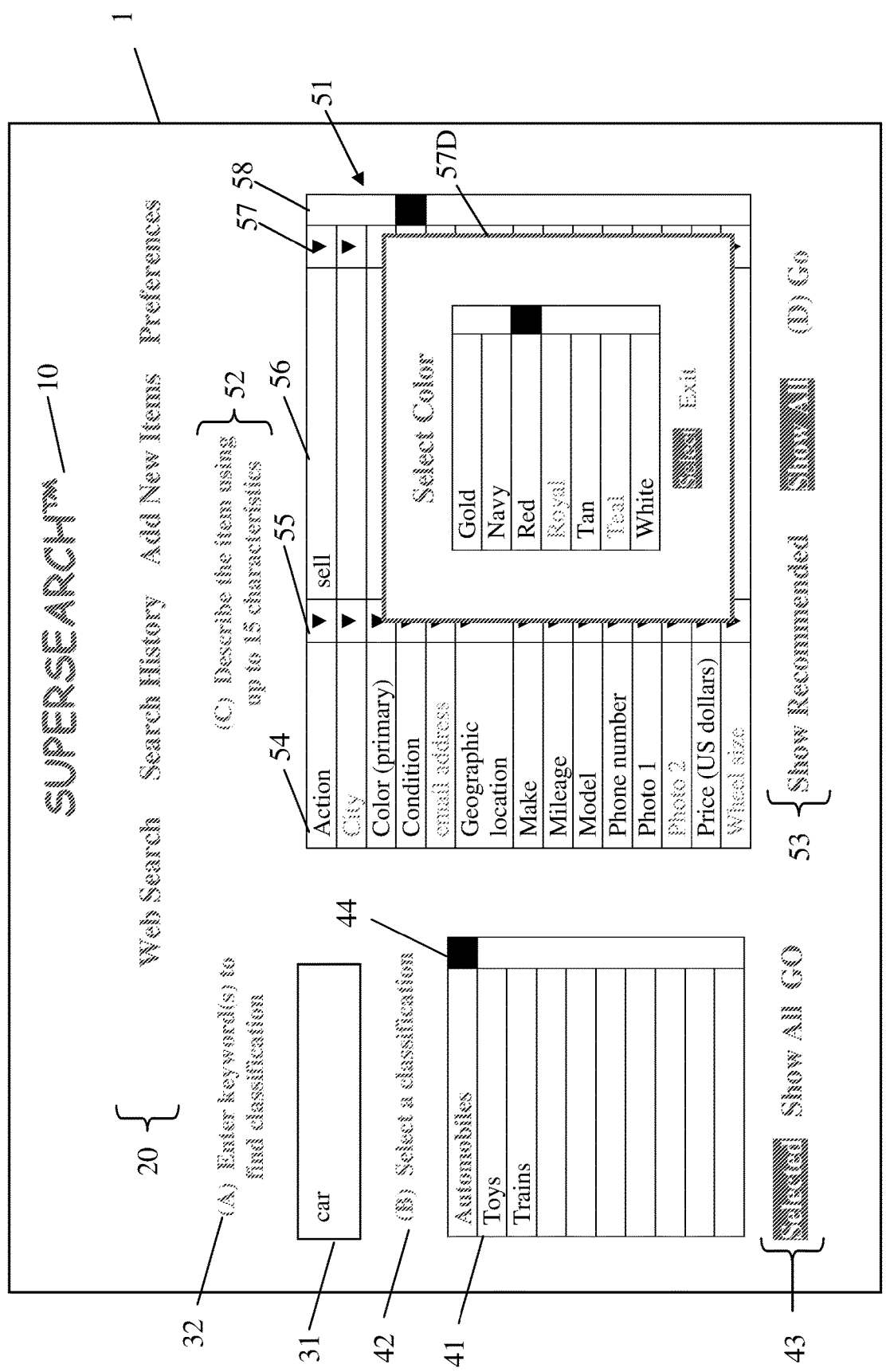
FIG. 1D is a mock-up of an alternative sample search interface.

FIG. 1D is similar to FIGS. 1A-1C, except that the Show All button is selected. Here the system shows all available parameters, with the recommended parameters differentiated in some manner from the non-recommended parameters. In this particular case the system shows recommended parameters in normal black font, while the non-recommended parameters are grayed out. All differentiators are contemplated, including for example use of italics, bolding, different colors, and use of a (R) symbol. The drop-down box 57D shows all (meaning all or at least a superset of the recommended) values previously stored with respect to the color parameter. There would usually be similar drop-down boxes for values for the other parameters.

Although this particular embodiment shows buttons to select between Show Recommended and Show All, it should be appreciated that one could simply show all parameters and values all of the time. Even in that case, though, it would be desirable to default the parameters to recommended parameters, and in that manner eliminate unnecessary work on the part of users in deleting the undesired parameters from the search interface.

Figure 2:
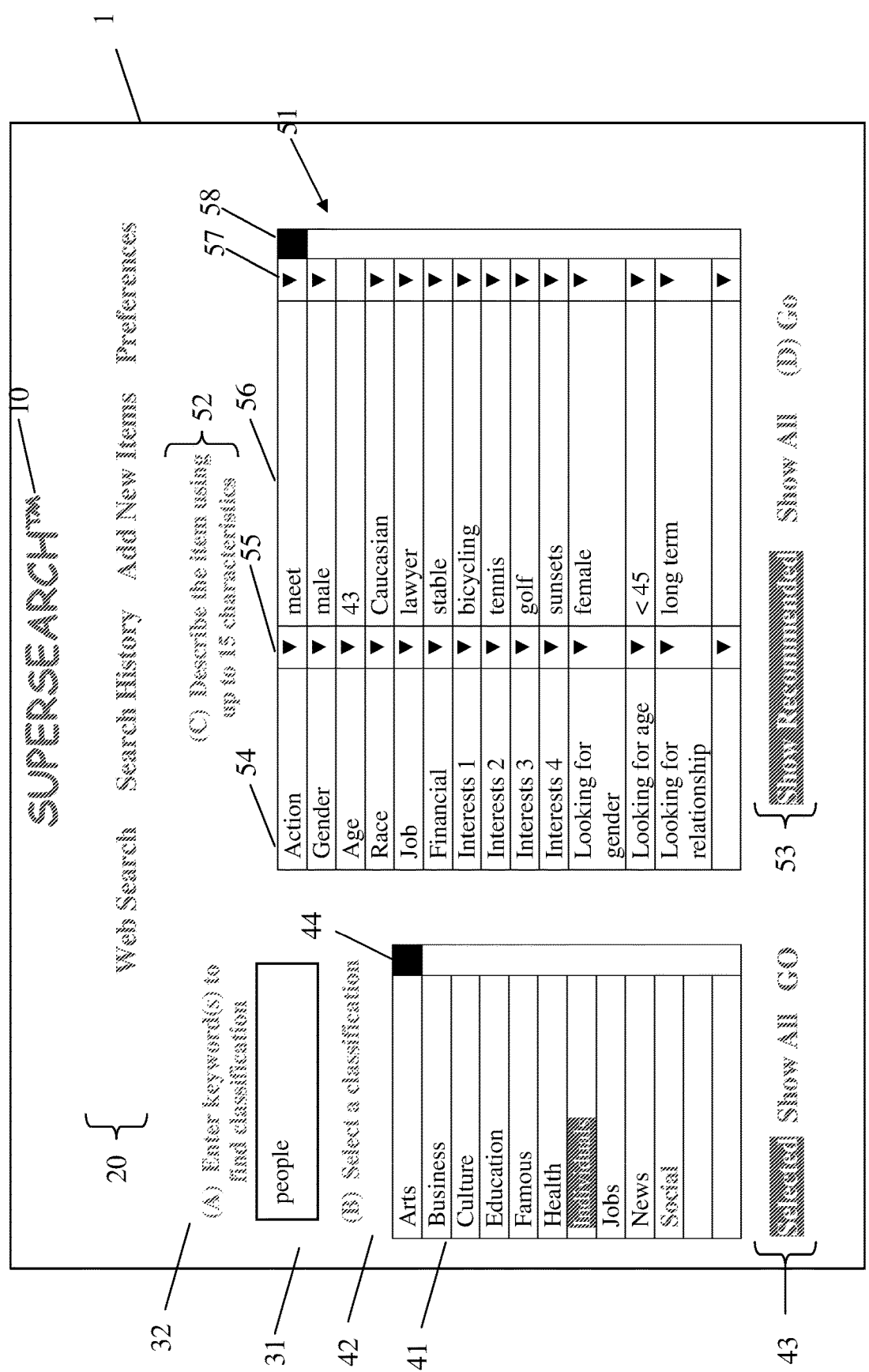
FIG. 2 is a mock-up of the sample search interface of FIG. 1A, but with different data.

In FIG. 2, the user entered "people" in the classification keyword box, and the system responded with a set of possible classifications. This listing is from another possible classification system, and is used as an example of something not taken from the US trademark classification system. A search for "people" on that latter system results in a list of 22 classifications, none of which relate to "personal want ads" for individuals. It is therefore appreciated that the classification system or systems used in conjunction with parameter/value databases for all types of marketplace information probably needs to be amended somewhat. As another example, if the number of real estate records is more than a few hundred thousand, it may be prudent to provide different classes for real estate in different states, e.g., Real estate-California, and Real estate-New York. In any event it is probably very prudent to split out Real estate-residential from Real-estate commercial.

By way of clarification, the term "marketplace" is used herein in its broadest possible sense to include everything that can be involved in a commercial or interpersonal transaction. Marketplace items include all manner of merchandise items (e.g., cars, clothes, personal grooming aids, pets and other animals, books, movies, music, travel, concert and other tickets, gasoline, electricity, writing implements, computers, houses, pharmaceuticals and medical devices, coupons, and any other items that can be bought and sold, leased, rented, traded, acquired, collected, etc), as well as all manner of service items (i.e., legal, dental, medical services, massage, handyman, new services, entertainments, etc), and also including all manner of personal interactions (i.e., employment listings, personal want ads, dating services, etc). The term "marketplace" does not include thoughts and thought processes that remain with a person's own head.

As a derivation the system actually used will almost certainly have less than a 100% homology with any trademark database system, but advantageously will have at least a 25%, 50%, 75%, 80% and 90% homology with a US classification used by the USPTO. Homology for this purpose can be calculated by determining the percentage of classifications used in classification system that have an exact or paraphrased counterpart in the trademark classification system.

Figure 3:
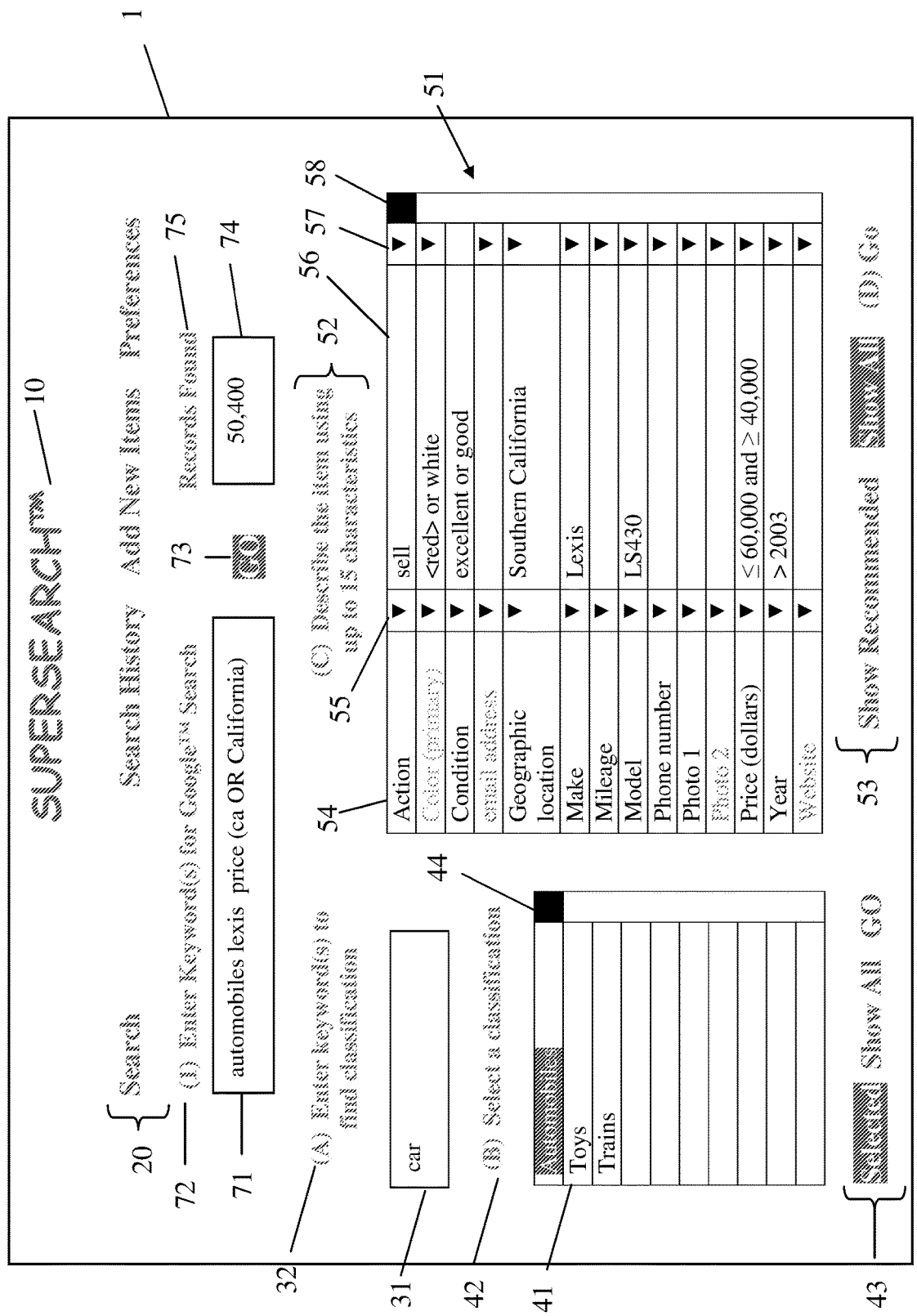
FIG. 3 is a mock-up of a sample web search interface.

In FIG. 3, the system has an additional step of selecting records from an extrinsic source, such as record links provided by a search engine results set, parametize the data in the selected records, and the perform the search on those selected records. Parametization can take place in any suitable manner, but can advantageously make use of XML or other data tags.

This additional step is designated step (1), and precedes steps (A)-(D) discussed above. In this particular embodiment a user enters a search string in field 71, using directions 72. He then presses the GO button 73, which causes the system to submit the search to Google™, Yahoo!™, Alta Vista™, Lexis™ or some other search engine (which could conceivably be chosen by clicking on the name of the search engine). Upon return of the results from the search engine, the system lists the number of results obtained, and that would or could be used as records for steps (A)-(D).

Figure 4A:
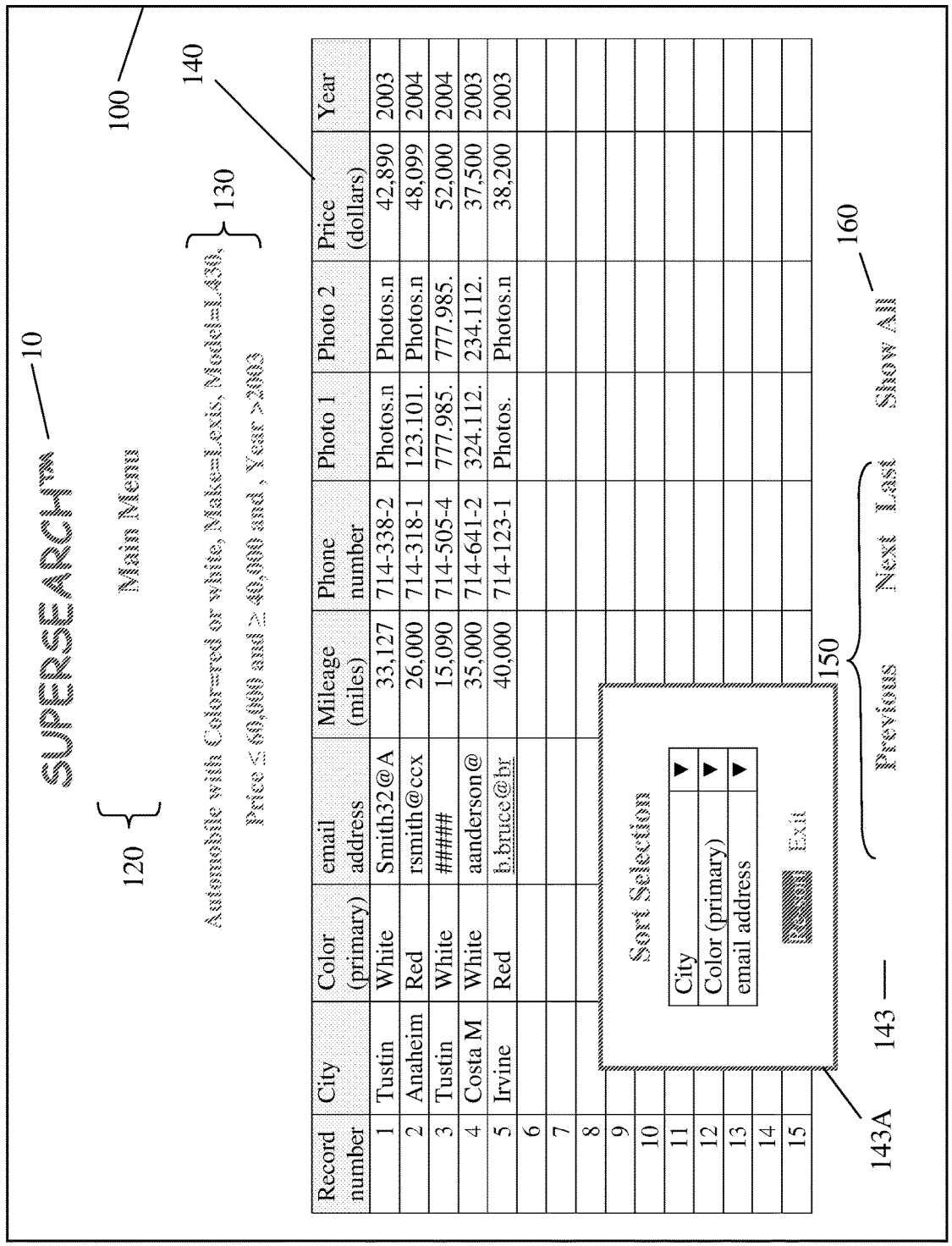

In FIG. 4A, an output interface 100 generally comprises a company identifier 10, a navigation line 120, a recap of filtering criteria 130, and a matrix 140 containing data. The matrix can be in Excel™ or other proprietary spreadsheet format, or more preferably is in a non-proprietary format. The matrix 140 can have any suitable number of data rows, but will likely have a maximum number of rows set in the Preferences interface (see FIG. 6).

In this particular case the data represents information responsive to the search of FIG. 1A. Readers will note that besides a record number, the table is limited to the columns identified in the search interface 51. This is not a hard and fast rule, but is advantageous because the user can often see in one place all the information he wants to see, but none of the information he didn't want to see. If the rows are too wide or too numerous, it is contemplated that the matrix can include horizontal and vertical sliders (not shown). It is certainly preferred that any links, such as those to the photos, will be live. It is also contemplated that clicking on the record number will trigger production of another interface (see FIG. 4C) that shows all public parameters and values for the item, whether or not they were selected by the searcher.

Sorting can be straightforward as shown. When the user clicks on the Sort button in selection row 143, the system provides a pop-up window 143A through which the user can select primary (1°), secondary (2°), and tertiary sorts (3°). User navigation among the various sets is straightforward using the First, Previous, Next, and Last buttons in navigation section 150. The user can see where he is in among the various sets, and can also jump to a particular set using the # button. There may also be a Show All button 160 that would show all records rather than just the subset of 20, 50, 100 etc records selected in the Preferences, provided of course that there are not so many records that showing all of them would be unwieldy.

The reader will also appreciate that use of a drop-down, pop-up or other box is merely a design choice. Thus, for example, drop-down boxes can actually be implemented as a box that extends upwards rather than downward from the triggering icon, or can be placed left or right of the icon, or even elsewhere on the display. The reader should therefore understand that in the present application the choice of any of these boxes is merely presented as a matter of convenience, and that any of them could readily be substituted by any other of them.

FIG. 4B is similar to FIG. 4A except that some of the columns are directed to auctions. The links there can be live, and preferably point to individual pieces of data residing on a server that handles bids. As shown, auction parameters can advantageously include: Auction, last bid amount; Auction, last bid date/time; and Auction, last bid client number.

Figure 4C:
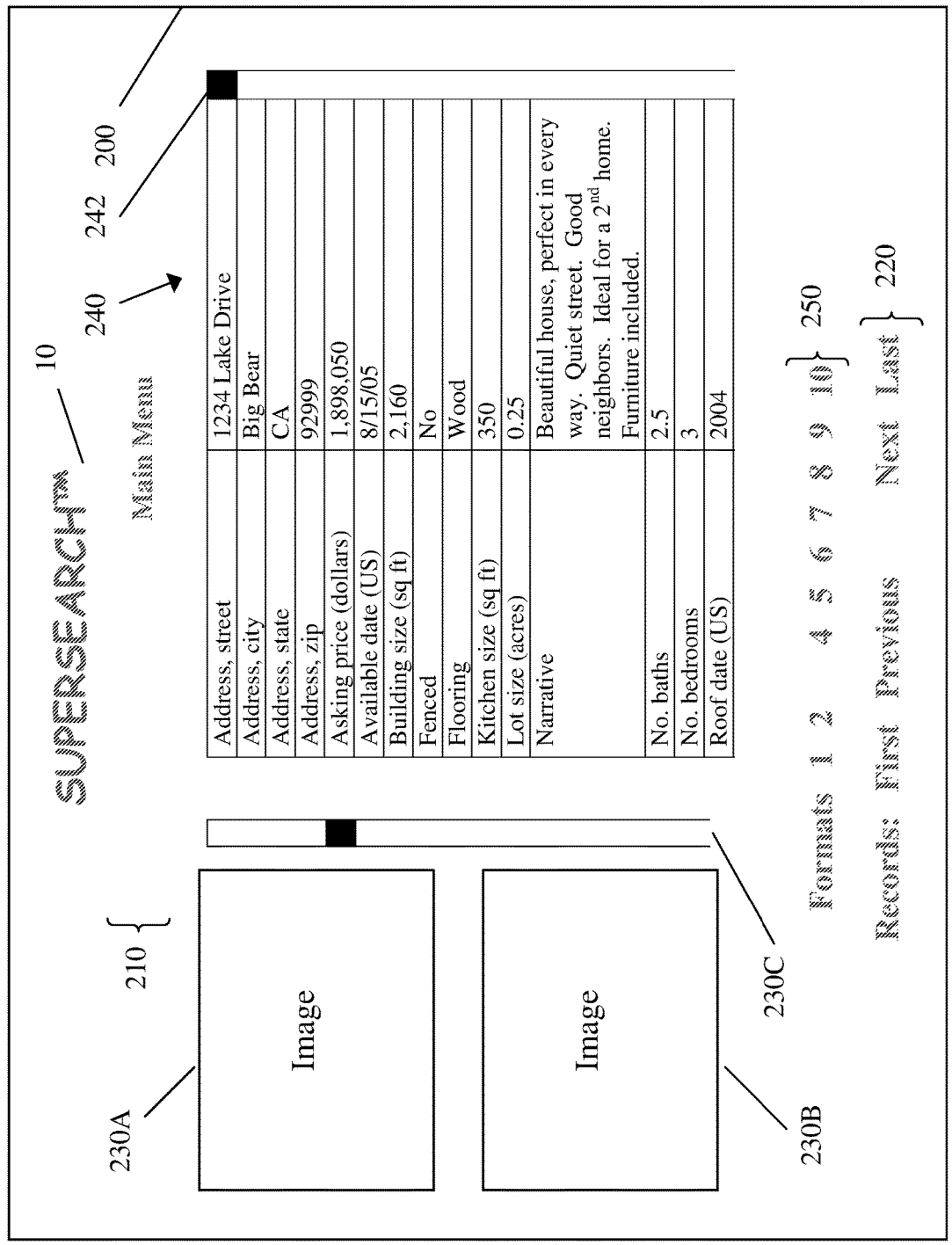
FIG. 4C shows a preferred format for presentation of a full record.

FIG. 4C shows a preferred format for presentation of a full record interface 200, along with resolved links. As with other preferred interfaces there is a navigation line 210 to other interfaces, but here there is also a selection line 220 to select another record in the items list, e.g. 140 of FIGS. 4A-4D, or FIG. 2. There are also images 230A, 230B, and a slider 230C to select among other images. Main data table 240 lists all parameters and value pairs for this item, and also includes a slider 242. If this interface were being used to reflect items just recently entered or modified by the data provider, it would include private parameter/value pairs, but if presented to another user the interface could hide entire private parameters and/or private values. It is contemplated that the format of the interface can advantageously be selected using format selector line 250. It is presently preferred that a limited set of available formats would be provided by the system designer, although and other formats may, for example, show more a single larger image, or more images without scrolling. As currently contemplated the format could be selected by the data provider on an item by item basis when this interface is presented to verify entered data, but could still be overridden by the searcher simply by clicking on a different format.

Figure 5A:
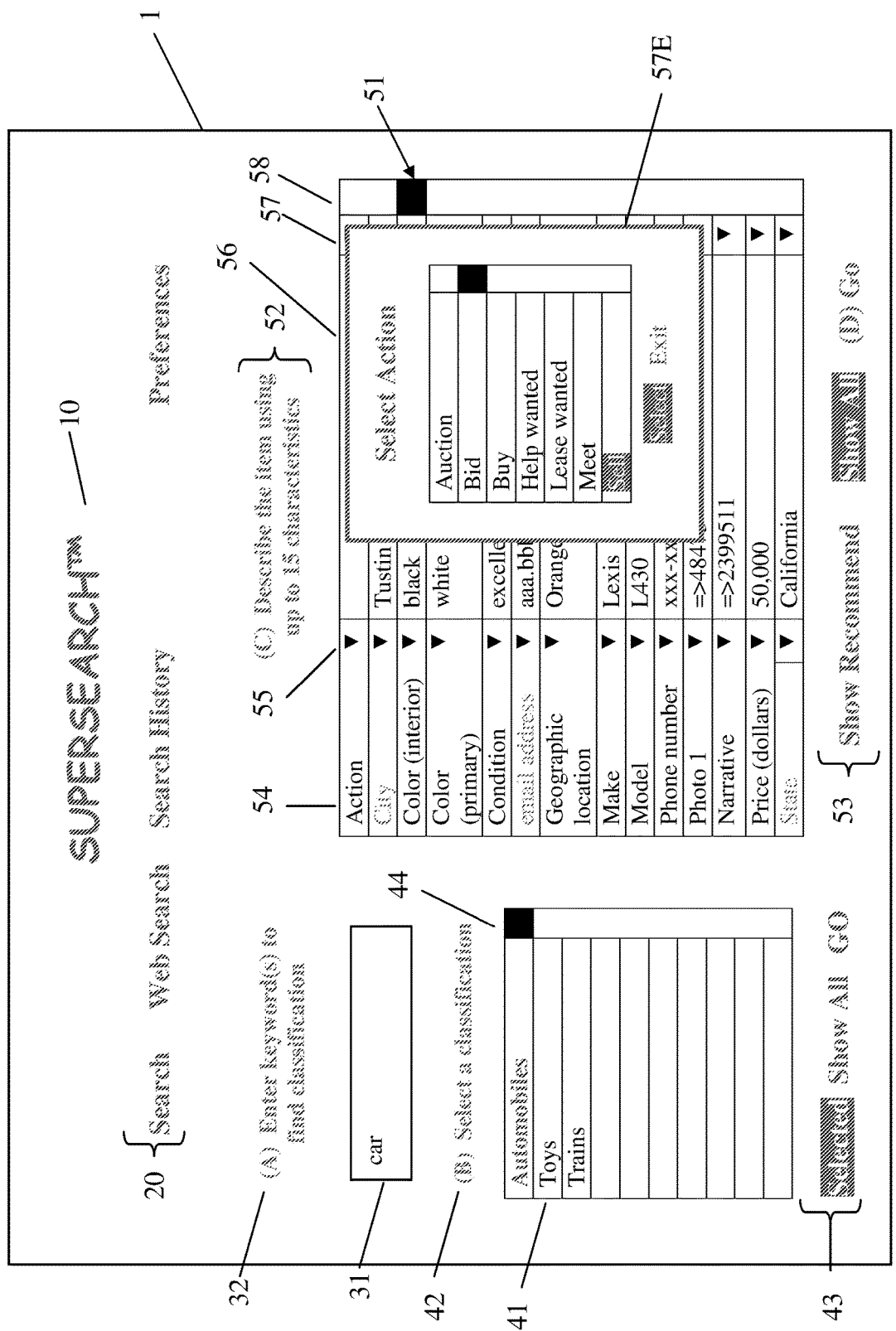
FIG. 5A is a mock-up of a sample interface for adding new items.
Figure 5B:
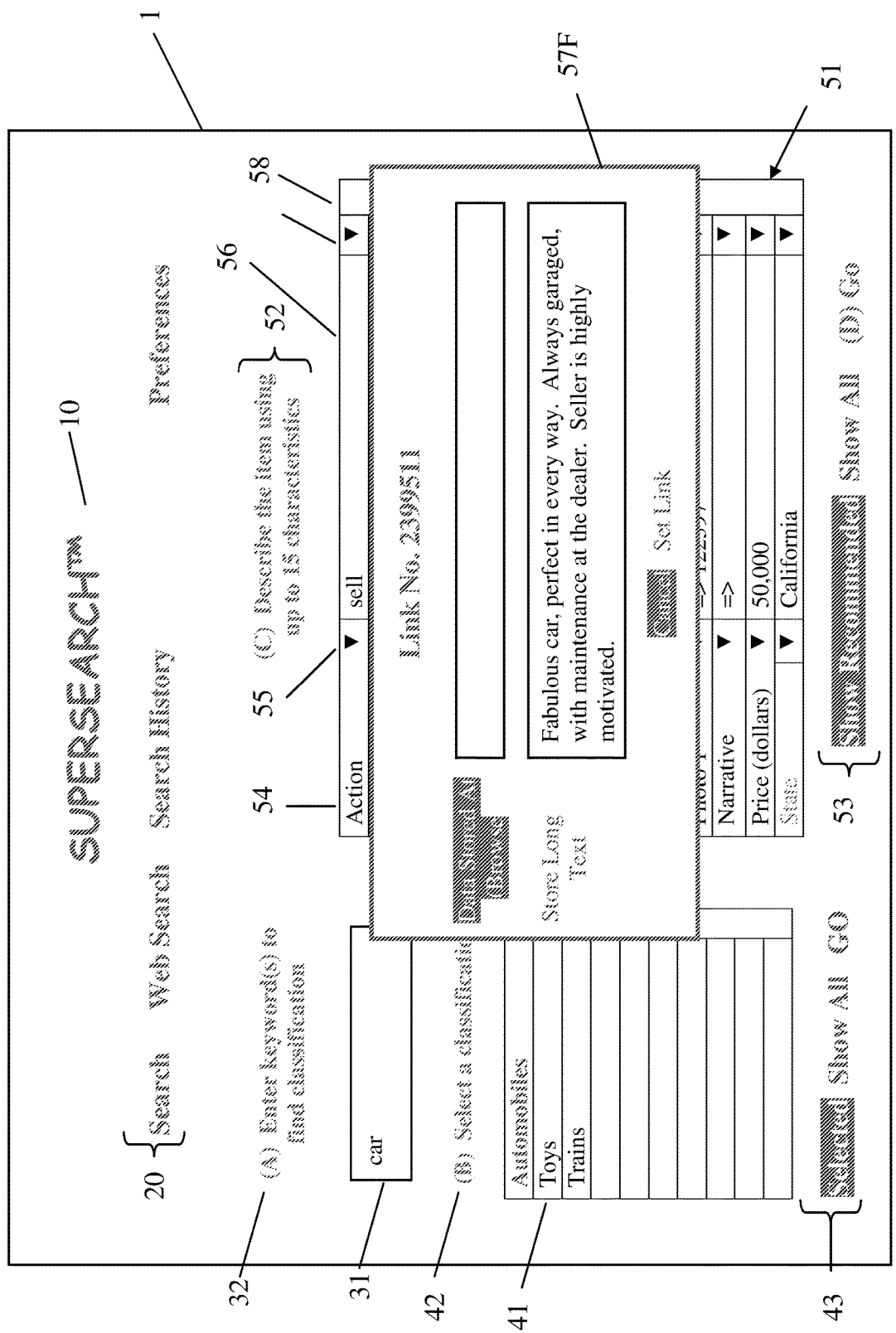
FIG. 5B is a mock-up of a sample interface for adding new items, showing an interface for setting a link.

FIG. 5A, 5B show substantially the same interface 10 of FIGS. 4A, 4B, except that the navigation line 20 is selected to "Add New Items", and the functionality is a bit different. In this case the user still goes through the same steps (A) through (D) as discussed previously, but here the user is acting as a data provider rather than a data searcher. Clicking on the GO button stores the item record, and takes the user to a verification interface, which can advantageously be a full record interface such as those of FIG. 4C. FIG. 5A shows a sample drop-down box 57E, which in this instance shows value choices for the "action" parameter. FIG. 5B shows a sample pop-up box 57F, which in this instance allows the user to either browse for a file or other data, or add long text that will be stored by the system.

FIG. 6 is an interface for entering and maintaining user preferences. The interface 300 generally comprises the company identifier 10 and navigation line 20 discussed previously, and also includes two personal information tables 331A, 331B and instructions 332, selection groupings for maximum number of records output 342, web search number of records 344, standard units 346, override units 348, language 350, and adult filter 352. The units table 360 is initially populated with values as a function of the selection in standard units 346, but allows a user to change his/her preferences on specific units. thus, for example, a user may prefer to use American units for most measurements, but use MKS units for force. The interface also allows a user to select preferred units within a system. Thus, a real estate user may prefer to default to square feet for area, while a farmer may prefer to default to acres.

B. Database Design

As discussed above, there is generally a trade-off in database design between efficiency of storage and efficiency of retrieval. U.S. Pat. Nos. 6,035,294, 6,195,652, and 6,243,699 contemplated a design that was quite efficient for storage, especially given that users could add their own new parameters to the system at will. But that system turns out to be extremely poor in terms of retrieval efficiency.

Figures 7, 8:
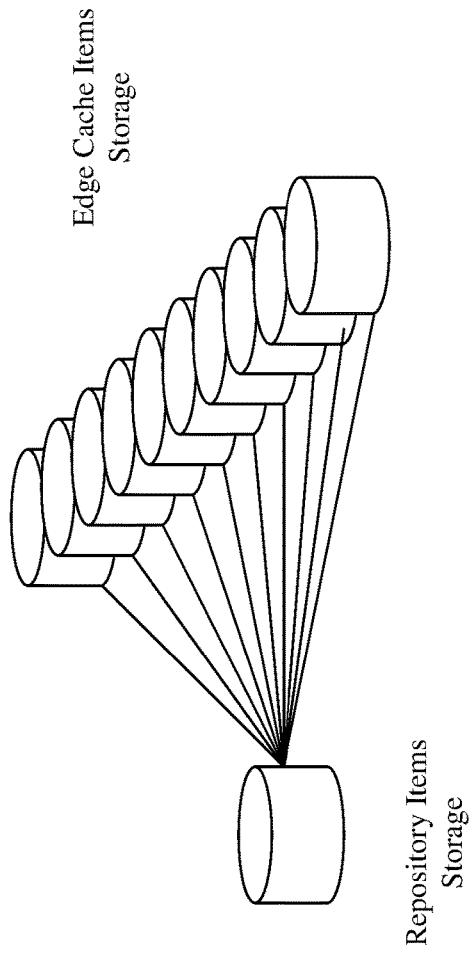
FIG. 7 is a schematic of a plurality of edge cache servers receiving data from a data repository.
FIG. 8 is a schematic of parameters, values and items record layouts in a data repository.

It now contemplated that instead of conducting all searches against the same database, it is far more efficient to have a repository for all item records, and then copy records for particular classes to edge cache servers for searching. An exemplary configuration is shown in FIG. 7. There, the repository 410 contains all item records, and various edge cache servers 420 contain subsets by class. It should be appreciated that in showing the repository 410 as a single unit, the data is not necessarily all stored on the same physical device. Indeed, a preferred configuration uses the Zetera™ technology that allows for convenient distribution and mirroring of data across multiple, even widely geographically distributed physical storage media. The same can be said of the various edge cache items storage 420.

As described more fully below, the repository 410 may well have the same, or a different data structure from that of the edge cache storage 420. It is currently contemplated that the best configuration may be to use a data structure such as that in FIG. 8 for the repository 410, and one or both of the data structures of FIGS. 9A, 9B for the edge cache storage 420. In that embodiment, one or more farm servers would keep track of usage for different classes of items, and instruct the system to load items data for individual classes onto one or more of the edge cache storage servers. Thus, in a system with ten edge cache servers, it may well be that servers 1-4 each contain copies of the real estate class items, servers 5-6 might each have copies of the personals and employment class items, server 7 might have a copy of the automobile class items, and servers 8-10 might split among them copies of the items for the remaining classes. As usage shifts, more servers can be brought on-line, and/or the classes administered by the various servers may be shifted about.

FIG. 8 shows a possible data structure 500 for the repository 410. This structure utilizes a parameters table 510 that includes pointers to class, a literal of the parameter name, a designation of whether this parameter is kept private to data providers, a pointer to a units table, a group number that could be used to group parameters, a designation as to whether this parameter is recommended for the class, and a pointer to a limited values table. The privacy indicator could be as simple as a yes/no indicator, or could be stored as a range (e.g. 0-10). The units table will probably grow to be quite extensive, because there are more than 9,000 recognized units of measurement. The limited values table can advantageously contain a number of values group. For example, one grouping of limited values might be a listing of automobile makers, and another grouping might be a listing of ten or twenty basic colors (red, orange, yellow, green, blue, violet, white, black, tan, silver, gold, etc. The numbers in parenthesis are bytes sizes that could be utilized. It is estimated that the system will contain a thousand or more classes, each with between twenty and 60 parameters. The size of each record in this sample table is 123, providing 4 records per 512 byte block. A table containing 2,000 parameters is only about half a megabyte.

The values table 520 includes a literal of the value name, a designation as to whether this value should be kept private to data providers, and data type (floating point, integer, IP pointer, text, etc), and a pointer to a format designation (e.g. nnn.nnn.nnnn, nnnnn.nn, AAAnn, etc). Since number literals and pointers can be stored directly in the values fields of the items table, the values table only needs to store text. Nevertheless, it is contemplated that there could be several thousand records in the values table. The 16 byte size for values literals is a tradeoff among several different factors, but most especially a desire to accommodate most values literals, while discouraging users from using excessively long values. Sixteen bytes is plenty to store almost all values, including. The reader will note that we avoid most two-word values such as "excellent condition" because "excellent" is a value of the parameter "condition". There is no need to repeat the parameter within the value. Record in this table are estimated to be 24 bytes, providing 21 records per 512 byte block. A table containing 10,000 values is again only about half a megabyte.

The items table 530 contains a pointer to a user ID record, the date the record was added, a date that the record is scheduled to be deleted, a privacy designator, a pointer to class, and a series of parameter/value pairs, which in this case is shown as 60. Assuming the parameter pointers require only three bytes, and that most numbers can be stored in five bytes, the record fits within a 512 byte block. Records here are estimated to be 123 bytes, providing 4 records per 512 byte block. Thus, one could store 500 million item records using only about 12.5 gigabytes of storage.

Those skilled in the art will appreciate, however, that data structure 500 is extremely inefficient for searching. To match all items for a given class that have five or six parameter/value limitations, the system has to filter by class, then parse and examine the entire record of every record. For instances where there are hundreds of thousands of records, that process is just way too slow.

Figure 9A:
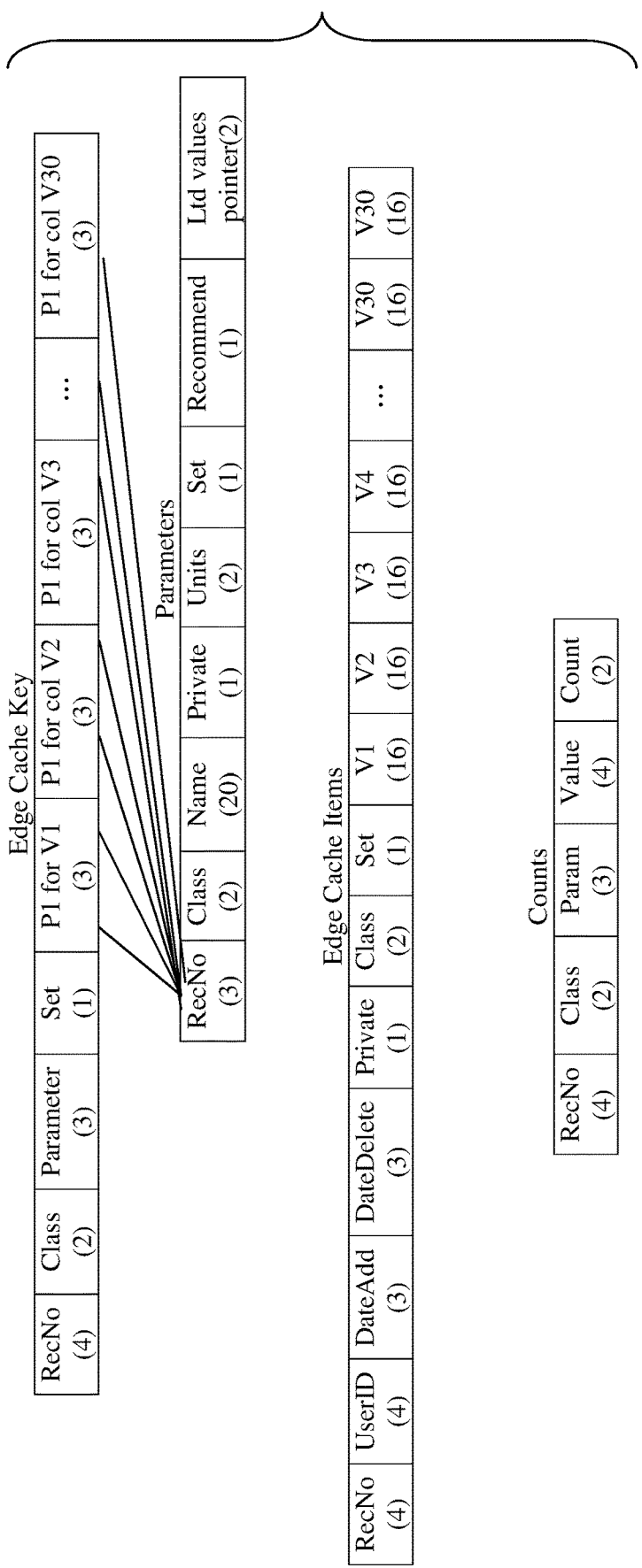
FIG. 9A is a schematic of parameters, values, items, edge cache key, and counts record layouts in a preferred edge cache server.

FIG. 9A shows a data structure 600 that is preferably used for the edge cache servers 420, but could also be used for the repository 410. Here, the system uses the same parameter 610 and values 620 records, and still stores the values or value pointers in the items table 630. But instead of storing the parameters pointers in the items table 630, the parameter pointers are stored in a key file 640, which designates which columns in the items tables are used for which parameters. The significant twist over a normal table header is that the columns are used for different parameters depending on the class of the record. For example, columns 8-10 could be used to store values and value pointers for the parameters make, model, and year in an automobile class, but the parameters no. beds, no. baths, and area for a real estate class. A significant difference here is that the values are unpacked, and literals stored in the table instead of values pointers for both numbers and text. Interestingly, even assuming that we utilize 16 bytes for literals, records are only 498 bytes. Thus, item records for a class with a million items can be stored in 512 megabytes, allowing processing to proceed entirely within internal RAM. Similarly, a processor could handle 20 or 30 smaller classes in the same database, where the total number of records is still only about a million.

Theses database are also extremely fast to search because a standard SQL or other search command can be used to match data, use wildcards, ranges, and so forth. Indeed, it is contemplated that all of the processing done at the edge cache servers can be accomplished entirely in internal memory, thereby vastly increasing the speed of the system. Moreover, one could readily use blade servers, where a single box could have ten or more servers, which are booted up using a single hard-drive.

Now it is true that the contemplated records in the items table 630 only provide 30 columns for values. One would ordinarily assume that such a limitation could not accommodate items records in a class having 60 or 70 different parameters. That problem is solved by using the set field to designate different sets of parameters. Thus, for a real estate classification, columns 8-10 could be used to store values and value pointers for the parameters "no. beds", "no. baths", and "living area" for a real estate class in set 1, and the three same columns could be used to store values and value pointers for the parameters "pool", "gazebo", and "bath house" for the same real estate class in set 2. That added level of complexity still doesn't prevent the system from using standard search commands against the items database 630; one simply also needs to include a restriction as to class.

If one did choose to load data into the data structure 600 using records from data structure 500 for a given class, for example, the process would be straightforward. One could advantageously identify the parameters and values used in each record being loaded, and count the occurrences in a table using a record format such as record 650. After examining all the records, it is a simple matter to determine which parameters are the most frequently used, and then create one or more key records in which the most commonly used parameters are associated with low column numbers, and the less frequently used parameters are associated with higher column numbers, or even columns in a second or third set. Where records are loaded for multiple classes, the system would simply create multiple key records for the different classes. The system need not, but could use the data in the key records to determine which parameters and values are recommended.

Figure 9B:
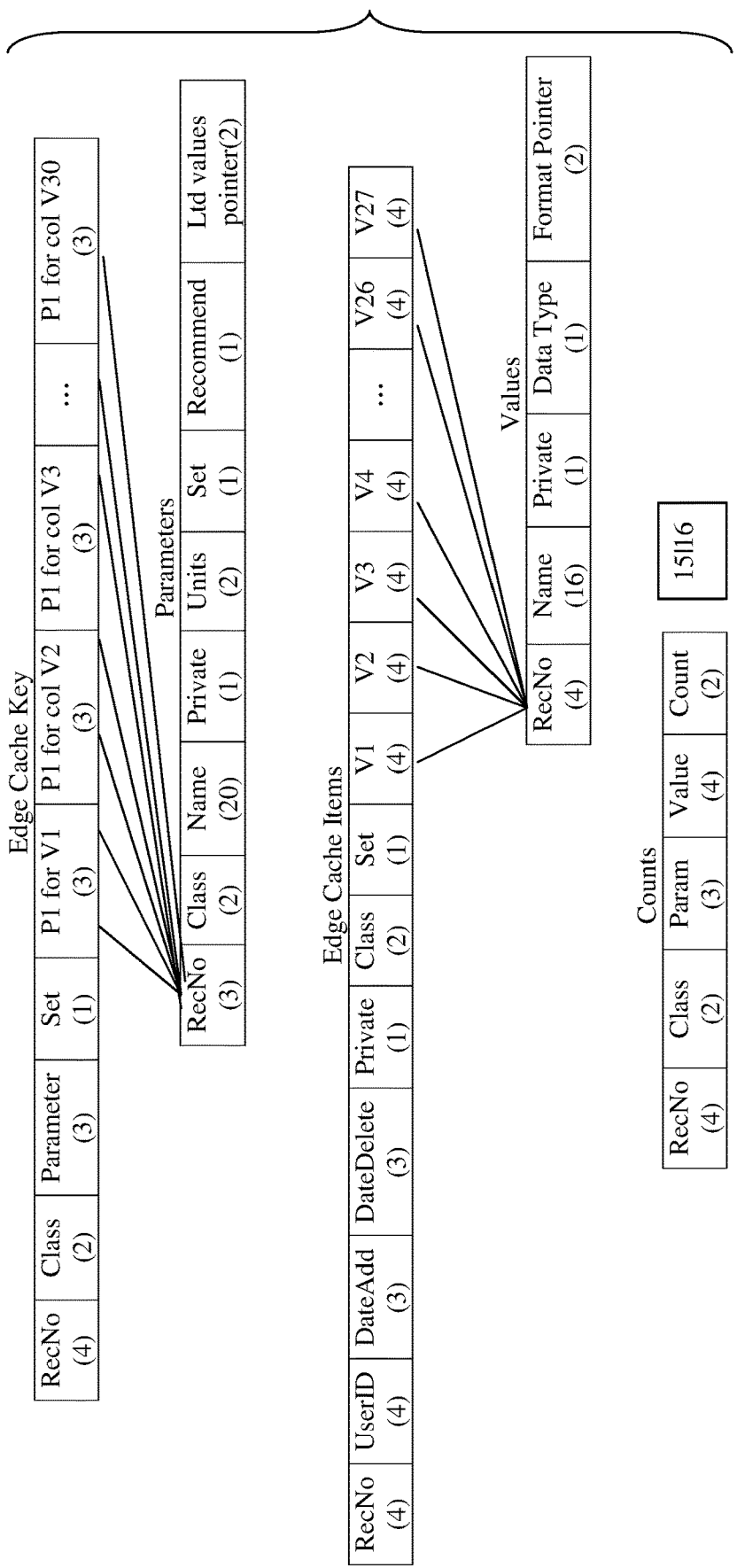
FIG. 9B is a schematic of parameters, values, items, edge cache key, and counts record layouts in an alternative edge cache server.

Items table 700 in FIG. 9B is similar to items table 600 FIG. 9A, except that the values cells are loaded with pointers to the values table rather than the literal values. Assuming one reduces the number of values columns from 30 to 27, that allows 126 byte records, which is as efficient in terms of storage table 500, but still only half as efficient as table 600. One can also readily envision an intermediate table (not shown) that includes the first 8 bytes of each value rather than the full 16 bytes. Such a table could have 29 values columns and still have only 250 byte blocks.

C. Private Data

It is well known to provide password protected security to information at a document level. Microsoft™ Word™ and Excel™ documents, for example, can both be encrypted, with decryption controlled by password protection. It is also known to provide password protected security at a supra-document level, as for example by providing password protection to entire directories, applications, or web sites, which might contain dozens or even thousands of page documents. It is also commonplace to encrypt information in individual packets transmitted information on a packet switched network. And it is commonplace to encrypt individual segments or frames of a video or audio file.

What is not known, however, is password type security protection at the sub-document level, where some portions in a document are encrypted but the remainder or at least other portions of the document are not encrypted. Perhaps one of the simplest examples is a letter in which most of the text is ordinary ASCI, but numbers or other information of key importance are encrypted. On display by Word™ or other word processor, such a document would either be displayed entirely as "garbage", or more preferably the non-encrypted portion would be displayed normally, with the encrypted portion being displayed in some non-readable format such as "*****" or "######". Thus, a sentence might read "Please transfer ####### to the checking account no. ######." Clicking on the encrypted portion would initiate an authorization routine that may, for example, prompt the viewer for a password or key.

Sub-document encryption may be especially useful in hyper-text documents. For example, an HTML letter may include hyperlinks to WWW web pages. When the letter is displayed by a Web browser, or perhaps an HTML compliant e-mail browser, one or more of the linked portions may be readable only if the viewer supplies the correct password(s).

As indicated above, decryption may be authorized by prompting a viewer for a password upon the viewer's clicking on an encrypted portion. All other methods, however, of authorization are also contemplated. For example, authorization could be prompted by moving a cursor over or near an encrypted portion, such as with the "tab" or other cursor movement keys. Another possibility is that prompting for a password occurs without any viewer action upon display of the document. HTML is essentially a script type language, and display of an HTML document involves execution of the script by some sort of interpreter. When the interpreter evaluates the encrypted portion, it could automatically prompt the viewer for a password at that time. Still another alternative is that the viewer's system could store one or more passwords in a "library" for use in decoding a document upon display.

The term "password" is used herein to mean any form of authorization. Passwords are thus contemplated to include literals that satisfy an exact lookup match, or perhaps a wildcard match. By way of example, a portion of a document may be decrypted using any password that matches the format FET##QWA where # is a numeric digit. Different users may be given different digit portions of the password, and the system could keep track of which passwords were used at which times. Passwords may also be keys, such that the password itself is used not only as authorization but as a literal to assist in decrypting the encrypted portion.

Where "matches" are used in decrypting, the "match" against which a password may be compared may be stored within the document itself, such as in a tagged portion. XML or other tagging protocol may advantageously be used for that purpose, especially since CML allows hierarchical and associative tagging. Thus, a word or other phrase and its corresponding password may be stored in encrypted form, and tagged with a first tag indicating that the phrase is encrypted, and a second tag that indicating that the password is to be used to decrypt the phrase. Key type passwords may be stored in a corresponding manner within the document.

Alternatively, the password(s) used in decrypting a document may be stored elsewhere entirely. In hyperlinked documents, for example, one or more passwords may be stored in a web page that is completely disconnected from the document. In that case a document could be disseminated, and subsequently the password(s) could be changed so that even those viewers who received the document, and knew the passwords at one time, would be unable to decrypt one or more encrypted portions of the document.

Encryption of individual values is especially useful where multiple different types of marketplace items are stored in, and retrieved from, a system that parametizes the data using at least five, ten, twenty or more parameters. Among other things, this would allow data providers to store information on a public access database, while retaining a reasonable level of comfort that the data will be protected. It would also allow data providers to use a public access database to store pointers to data within their own private databases or websites, while ensuring that they, but not others, could visualize the data when desired. In FIG. 4A, for example, the email address in the third data row is obfuscated with the ##### symbol.

Thus, specific embodiments and applications of data storage using spreadsheets and metatags have been disclosed. It should be apparent, however, to those skilled in the art that many more modifications besides those already described are possible without departing from the proposed claims and the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of storing descriptors of marketplace items for possible sale or purchase, comprising:

providing a database having parameters associated with classifications;

providing, via a computer system comprising at least one computer, a first parameter interface that accepts a classification, from an existing set of classifications in the database, for a new parameter, wherein the new parameter did not exist in the database prior to receipt;

designating the new parameter as a new recommended parameter for the classification upon determining that the new parameter is used by a user of the computer system with the classification;

providing, via the computer system, a second parameter interface to receive the classification as a selected classification and to display a list of database parameters associated with the selected classification comprising (a) a non-recommended subset of the database parameters associated with the selected classification and (b) a recommended subset of the database parameters associated with the selected classification, wherein the non-recommended subset is differentiated from the recommended subset, and wherein the recommended subset comprises the new recommended parameter.

2. The method of claim 1, further comprising displaying the content of each of the first and second parameter interfaces, respectively, in separate data fields on a single display.

3. The method of claim 1, further comprising providing a values interface configured to accept a submitted value to be associated with the new parameter, such that a new marketplace item is described on the database at least in part using a parameter-value pair comprising the new parameter and the submitted value.

4. The method of claim 3, further comprising allowing the user to designate the value as private.

5. The method of claim 1, wherein the second parameter interface is further configured to accept a selection of whether the recommended subset of the database parameters displayed in the second parameter interface is sorted alphabetically or according to a function of prior usage.

6. The method of claim 1, wherein the step of designating the new parameter as a recommended parameter comprises receiving a discretionary choice from a human being.

7. The method of claim 1, further comprising rendering to the user a table displaying a subset of the marketplace items that match the classification, wherein the marketplace items are filtered by values specified by a user corresponding to recommended parameters selected by the user.

8. The method of claim 7, wherein at least two of the specified parameters are related.

9. The method of claim 7, wherein at least one of the specified values comprises data other than text.

10. The method of claim 9, wherein the data other than text comprises a sound clip.

11. The method of claim 7, further comprising using the table to show auction information selected from the group consisting of a last bid amount, a last bid date, a last bid time, and a bidder identifier.

12. The method of claim 7, further comprising using the table to show personal want ad information.

13. The method of claim 7, further comprising using the table to show employment listing information.

14. The method of claim 7, further comprising using the table to show real estate listing information.

15. The method of claim 1, wherein the recommended subset of the database parameters are distinguished from the non-recommended subset of the database parameters via a filter that presents the recommended subset of the database parameters in a different font than the non-recommended subset of the database parameters.

16. The method of claim 1, further comprising allowing the user to designate the new parameter as private.

17. The method of claim 1, wherein the second parameter interface is further configured to automatically display a suggestion window whenever an input dialog receives text that fails to match a known parameter.

18. The method of claim 1, wherein the database comprises a second parameter that is related to a third parameter.

19. The method of claim 18, wherein the second parameter interface is further configured to receive a selection of parameters to be used for a new marketplace item, and wherein the second parameter interface is configured to automatically select the second parameter to be used for the new marketplace item when the received selection of parameters comprises the third parameter.

* * * * *